United States Patent
Zimmer et al.

(10) Patent No.: US 7,725,747 B2
(45) Date of Patent: May 25, 2010

(54) METHODS AND APPARATUS TO PERFORM POWER MANAGEMENT IN PROCESSOR SYSTEMS

(75) Inventors: Vincent J. Zimmer, Federal Way, WA (US); Michael A. Rothman, Puyallup, WA (US); David C. Estrada, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 386 days.

(21) Appl. No.: 11/277,842

(22) Filed: Mar. 29, 2006

(65) Prior Publication Data

US 2007/0234075 A1 Oct. 4, 2007

(51) Int. Cl.
*G06F 1/32* (2006.01)
(52) U.S. Cl. .................... 713/322; 713/320
(58) Field of Classification Search .......... 713/300–324
See application file for complete search history.

(56) References Cited

U.S. PATENT DOCUMENTS

| | | | |
|---|---|---|---|
| 6,105,142 A * | 8/2000 | Goff et al. ............... | 713/324 |
| 6,823,516 B1 * | 11/2004 | Cooper ..................... | 718/108 |
| 7,188,261 B1 * | 3/2007 | Tobias et al. ............. | 713/300 |
| 2002/0133792 A1 * | 9/2002 | Raghunathan et al. ..... | 716/4 |
| 2003/0065497 A1 * | 4/2003 | Rhoads ..................... | 703/18 |
| 2007/0157042 A1 * | 7/2007 | Jahagirdar et al. ........ | 713/320 |

OTHER PUBLICATIONS

Extensible Firmware Interface Specification, Intel Corporation, Version 1.10, Dec. 1, 2002, 1084 pages.
Extensible Firmware Interface Specification, Version 1.10, Specification Update, Intel Corporation, Version -001, Nov. 26, 2003, 63 pages.
Baker et al., "Shmoo Plotting: The Black Art of IC Testing," Proceedings of the International Test Conference, 1996, 2 pages.
"Shmoo Plot Shapes," Aug. 1997, Hewlett-Packard Journal, 1 page.

* cited by examiner

*Primary Examiner*—Dennis M Butler
(74) *Attorney, Agent, or Firm*—Hanley, Flight & Zimmerman, LLC

(57) ABSTRACT

Methods of performing power management of a processor are disclosed. One example method includes obtaining a plurality of operating parameters related to the processor, determining potential power states by fitting a curve to the plurality of operating parameters, and selecting at least some of the potential power states as power states used to manage power consumption by the processor. Other embodiments are described and claimed.

27 Claims, 5 Drawing Sheets

METHODS AND APPARATUS TO PERFORM POWER MANAGEMENT IN PROCESSOR SYSTEMS

TECHNICAL FIELD

The present disclosure pertains to processor systems and, more particularly, to methods and apparatus to perform power management in processor systems.

BACKGROUND

Portable computers, such as laptop or notebook computers, are powered either by an alternating current (AC) power source or a battery power source. In general, it is desirable to reduce the current required to operate a computing or processor system. Reduction in current consumption by portable computers is particularly desirable because reduced current consumption results in longer battery life.

It has been established that the power consumption of a processor is proportional to the product of the processor's dynamic capacitance (C), the clock rate at which the processor is operating (f), and the square of the processor's operating or supply voltage ($v^2$). However, a processor operating at fast clock speeds requires a higher operating voltage than that same processor operating at a slower clock speed. Thus, to minimize the power consumption of a processor while a computer is operating under battery power, it possible to reduce the clock speed (f) and the operating voltage (v) of the processor, while maintaining acceptable operating performance of the processor. This sacrifices processing speed for extended battery life. Of course, it is not desirable to reduce the operating frequency or operating voltage to a point at which processor ceases to function properly (i.e., to cause the processor to operate in an out-of-state mode of operation). Thus, it is possible to determine voltage/frequency pairs, or two-tuples of operating parameters, at which processor operation is acceptable. As will be readily appreciated by those having ordinary skill in the art, the operating parameters defining acceptable operation for a first processor do not necessarily define acceptable operation for a second processor because each processor is slightly different in its processing parameters, which results in slightly different operating parameters and, thus, different voltage/frequency pairs at which processor current consumption is low but processor operation is acceptable.

Based on the differences between the operating parameters of various processors and the desire to determine low current consumption, voltage/frequency pairs of operating parameters for each processor are determined at the factory before the processor ships. For example, a processor is tested at various voltage/frequency pairs to determine acceptable operating parameters (i.e., frequency/voltage pairs or two-tuples at which processor operation is acceptable). The operating parameters (i.e., voltage/frequency two-tuples) yielding acceptable processor operation are then stored in model specific registers (MSR) on that processor.

During subsequent operation of the processor, a basic input/output system (BIOS) operating on the processor retrieves the operating parameters stored in the MSR and calculates a straight-line approximation to determine a straight voltage/frequency line along which the processor can operate so as to reduce current consumption when slower processor operating speeds are acceptable. Once the straight line is calculated based on the operating parameters, the BIOS determines a set of tables referred to as power state (P-state) tables in the advanced configuration and power interface (ACPI). The P-state ACPI tables may be used by an operating system power management (OSPM) entity, such as acpi.sys or other Microsoft Windows® drivers, to determine power reduced processor operating states that the processor can reliably support.

However, as will be readily appreciated by those having ordinary skill in the art, not all processors have linear voltage/frequency operating characteristics. In fact, most often acceptable operating voltage/frequency pairs have a square-law relationship. Any deviation from the calculated voltage/frequency line is error, which can take two forms: either disadvantaging the systems because it will not go to its lowest power state or, leading in the OSPM to direct the system to an out-of-state mode of operation.

DETAILED DESCRIPTION

Although the following discloses example systems including, among other components, software or firmware executed on hardware, it should be noted that such systems are merely illustrative and should not be considered as limiting. For example, it is contemplated that any form of logic may be used to implement the systems or subsystems disclosed herein. Logic may include, for example, implementations that are made exclusively in dedicated hardware (e.g., circuits, transistors, logic gates, hard-coded processors, programmable array logic (PAL), application-specific integrated circuits (ASICs), etc.) exclusively in software, exclusively in firmware, or some combination of hardware, firmware, and/or software. Accordingly, while the following describes example systems, persons of ordinary skill in the art will readily appreciate that the examples are not the only way to implement such systems.

Figure 1:
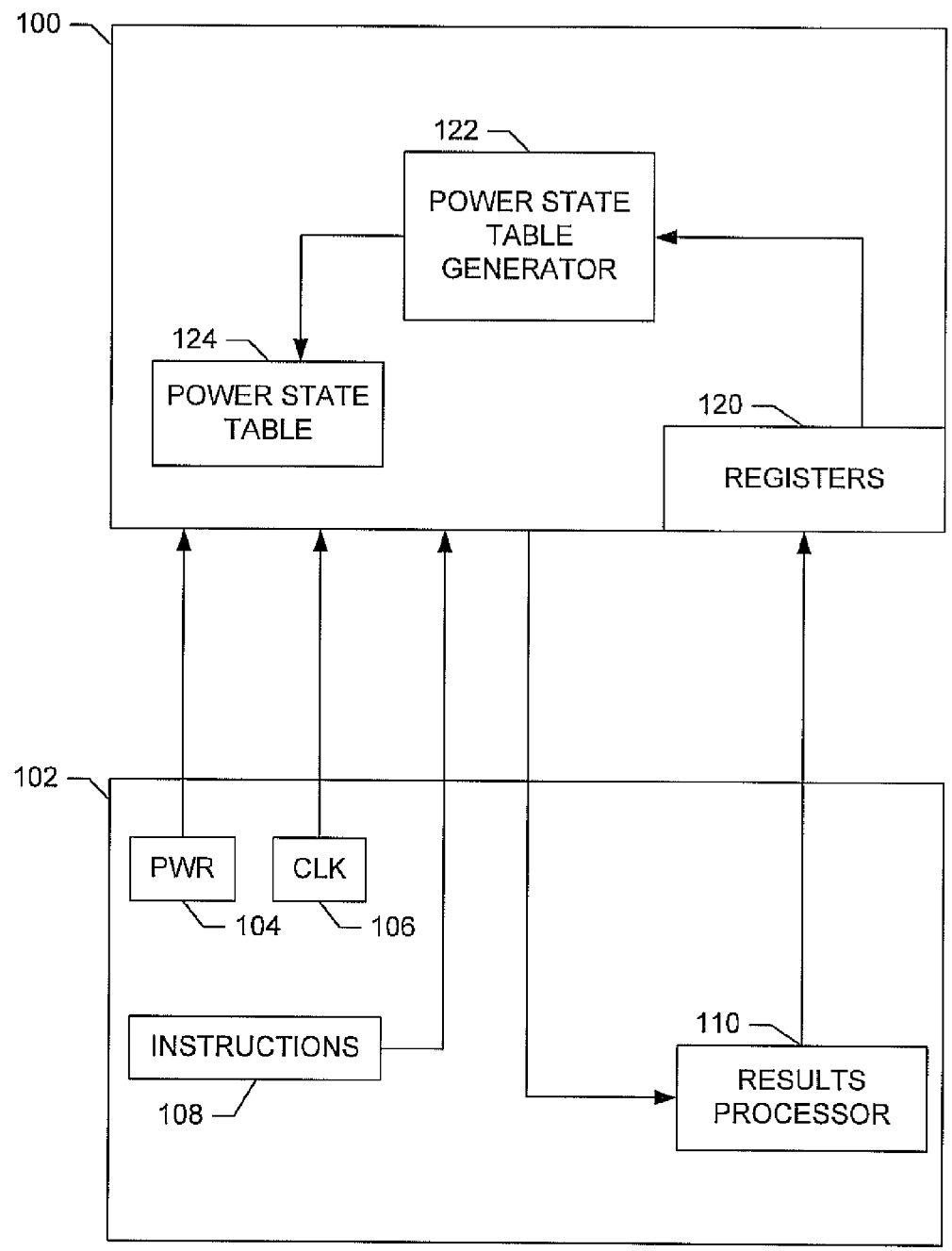
FIG. 1 is a diagram of an example processor under test.

With reference to FIG. 1, as is known to those having ordinary skill in the art, a processor 100 may be tested by test equipment 102 as part of a quality assurance and/or calibration processes in a factory or a test facility. This testing and calibration is carried out before the processor 100 is shipped to a reseller that may package the processor with other components to form, for example, a processor system such as a desktop or notebook computer, such as a processor system 500 of FIG. 5.

In addition to numerous other pieces of hardware or functionality, the test equipment 102 may include a power supply 104, a clock generator 106, test instructions 108, and a results processor 110. During testing and/or calibration, the power supply 104 and the clock generator 106 provide power and clock signals to the processor 100. The processor 100 then executes the test instructions 108 while the voltage output from the power supply 104 and the frequency of the clock signal from the clock generator 106 are varied. The results of the test instruction execution are provided to the results processor 110 of the test equipment 102, which determines supply voltage and clock frequency pairs (frequency/voltage two-tuples) or operating parameters at which processor 100 operation is acceptable. The results processor 110 outputs the acceptable frequency/voltage two-tuples to the processor 100 for storage.

As shown in FIG. 1, the processor includes, among other circuitry and functionality, registers 120 in which the operating parameters from the results processor 110 are stored. These registers 120 may be, for example, model-specific registers (MSRs). As described below in detail, the processor 100 also implements a power state table generator 122 that processes the operating parameters stored in the registers 120 to produce frequency/voltage P-states that are stored in a P-state table 124. In one implementation, the P-state table generator 122 may be implemented using logic, such as firmware executed by the processor 100 in a pre-boot environment phase of operation. That is, the power state table generator 122 may be implemented as part of a basic input/output system (BIOS). Additionally, the P-state table 124 data structure may be created and populated by the P-state table generator 122 and may reside in volatile or non-volatile memory found either within the processor 100 or outside of the processor 100.

In performing its functions, the P-state table generator 122 may perform any number of different statistical processes (e.g., interpolations, extrapolations, curve fits, cubic spline fits, etc.) on the operating parameters (frequency/voltage two-tuples) from the registers 120 to develop a line or curve that provides a number of frequency/voltage operating points that may be selected for use as P-states. As will be readily appreciated by those having ordinary skill in the art, P-states may be used to populate a P-state table that may be used by, for example, an operating system (OS) to control the power consumption of the processor by slowing the clock speed of the processor to reduce the power required by the processor.

Figure 2:
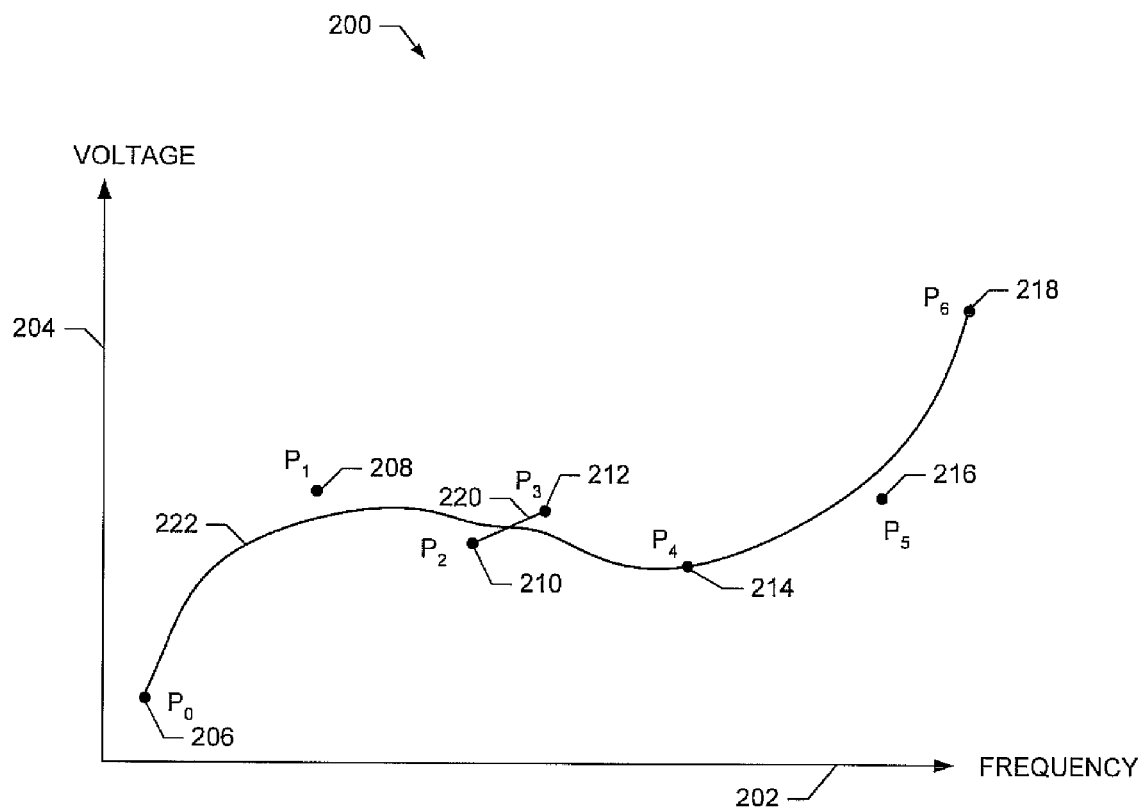
FIG. 2 is a voltage/frequency chart showing several operating parameters as voltage/frequency pairs and a curve fit to the operating parameters.

FIG. 2 is a voltage/frequency chart 200, wherein an x-axis 202 represents frequency and a y-axis 204 represents voltage. The chart 200 includes a number of operating parameter data points 206, 208, 210, 212, 214, 216, and 218 that represent frequency/voltage two-tuples, such as may be generated by the results processor 110 and stored in the registers 120. As will be readily appreciated by those having ordinary skill in the art, the faster the clock frequency at which a processor operates, the faster a processor can perform calculations. However, as shown in the chart 200, the faster clock speed at which a processor operates, the higher the operating voltage that must be supplied to a processor. Thus, as shown in FIG. 2, the constellation of operating parameter data points 206, 208, 210, 212, 214, 216, and 218 reflects the trend that higher operating frequencies require the processor to operate at a higher supply voltage.

The chart 200 also includes a line 220 representing a conventional linear fit of data points 210 and 212. Additionally, a potential P-state line 222 representing a curve fit (e.g., a non-linear fit) of a number of the data points 206, 208, 210, 212, 214, 216, and 218 is shown. The line 222 represents an infinite number of potential P-states that are determined by a curve fit of the data points 206, 208, 210, 212, 214, 216, and 218. As described below, the potential P-states represented by the curve may be used in the selection of power states that are used by a processor (or its OS) to change the supply voltage and/or operating frequency of a processor to reduce power consumption of the processor. For example, P-states may be selected by choosing points that lie at any desired point along the line 222. Thus, while a processor may store a relatively limited number of two-tuples, a curve fit, such as the line 222, of the two-tuple operating parameter data provides greater granularity for the selection of power states. That is, while only six two-tuples are shown in FIG. 2 as being provided by the processor, an infinite number of different two-tuples may be selected by selecting points on the line 222. Further detail regarding how a curve fit line, such as the line 222, may be determined is described below.

Figure 3:
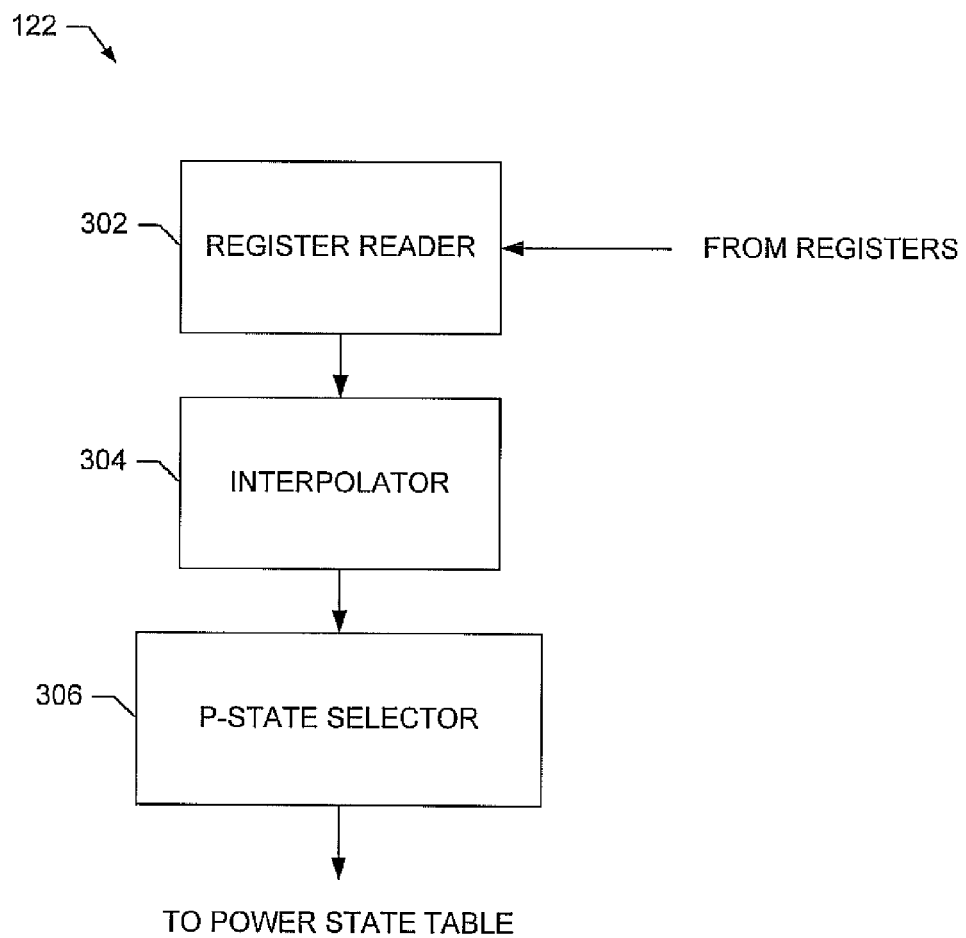
FIG. 3 is a block diagram of an example implementation of the power state table generator of FIG. 1.

FIG. 3 shows one example implementation of the power state table generator 122 of FIG. 1. The power state table generator 122 includes a register reader 302, an interpolator 304, and a P-state selector 306. As will be readily appreciated by those having ordinary skill in the art, the power state table generator 122 and the functionality included therein may be implemented using logic, such as hardware, software, firmware, or any suitable combination thereof. For example, the power state table generator 122 may be implemented in firmware that is executed as part of BIOS implemented by the processor 100, which may reside in a computing system such as the processor system described below in conjunction with FIG. 5.

In operation, the register reader 302 reads the operating parameters from the registers 120. In some cases, the operating parameters may be two sets of two-tuples. In other instances, the operating parameters may be several sets of two-tuples. The interpolator 304 then processes the two-tuples and interpolates a curve through or near a number of the two-tuples. This is also referred to as curve fitting. The interpolated curve represents a number of potential P-states at which processor operation is acceptable in terms of clock frequency and operating voltage. For example, the interpolation may be based on wavelet transformation, cubic spline interpolation, Fourier transformation, Bezier functions, and/or $n^{th}$ degree polynomial transformations, and/or basis functions.

After the interpolation is complete, the P-state selector 306 selects certain locations along the interpolation for use as power states that are written to the power state table 124. For example, the P-state selector may select a number of different frequency/voltage pairs lying along the interpolated line (e.g., the line 222), wherein the different frequency/voltage pairs have different processor power consumption and performance attributes. For example, the P-state selector may select 16, 32, 64, or any other suitable number of points that are evenly or unevenly distributed along the line 222. In this manner, the P-state table may be populated with a range of performance versus power consumption operating points that may be selected. For example, when a system desires to reduce power consumption (e.g., when a portable computer is powered by its battery), the processor may select a P-state having a low clock frequency and a low operating voltage. Conversely, when performance is desired at the expense of power consumption, a P-state having a high operating voltage and a high clock frequency may be selected for use by the processor.

Figure 4:
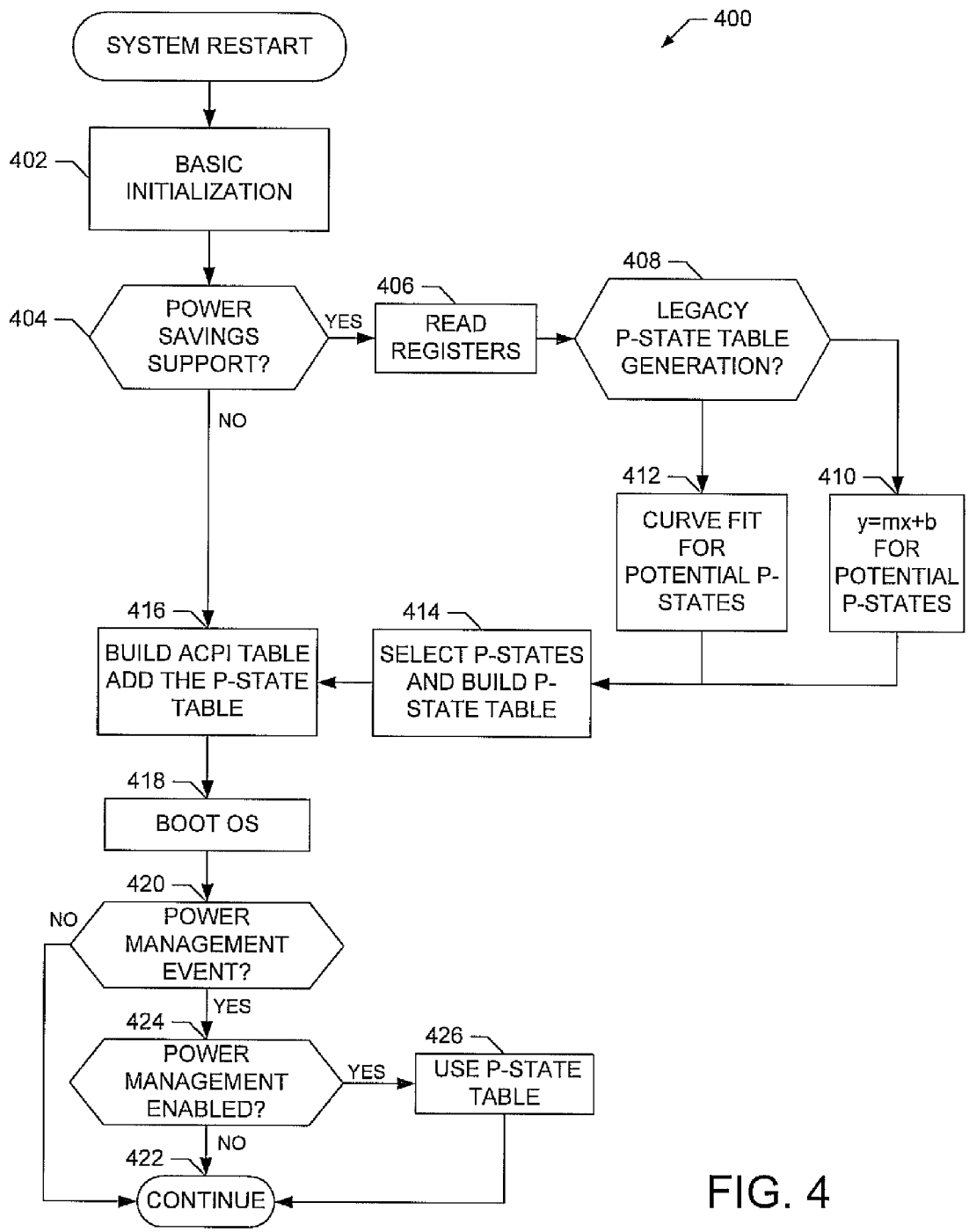
FIG. 4 is a flow diagram of a system reset process that may be carried out by the processor of FIG. 1.

A system restart process 400, as shown in FIG. 4, is one context in which the P-state generation may be performed and the resulting P-states may be used. While numerous functions are performed during a system restart, only the functions relevant to the subject disclosure are shown in FIG. 4. As will be readily appreciated by those having ordinary skill in the art, the process 400 may be implemented using logic such as, for example, BIOS firmware, software, hardware, or any combination thereof.

The system restart process 400 begins with a basic initialization (block 402) during which variables may be initialized, caches may be flushed, etc. After or during basic initialization (block 402), the process 400 determines if the processor (i.e., the processor being restarted) supports power saving modes (block 404). For example, in one implementation, the process 400 may determine if the processor supports power management features, such as Geyserville 3 (GV3).

If power savings modes are supported by the processor lock 404), the process 400 reads the registers 120 in which the processor 100 holds the frequency/voltage two-tuples or operating parameters (block 406). After reading the registers 120 (block 406), the process 400 determines if legacy P-state table generation is required (block 408). If legacy P-state table generation is required, the process performs a linear fit based on a pair of selected operating parameters (block 410). As will be readily appreciated, such a linear fit may be carried out according to the known line equation shown in Equation 1.

$$y=mx+b \qquad \text{Equation 1}$$

In which the variable y is the dependent variable, the variable m is the slope of the line between the two selected operating parameters, the variable x is the independent variable, and the variable b is the intercept. The result of the evaluation performed at block 410 is a line (e.g., the line 220 of FIG. 2) along which various P-states may be selected. Thus, the linear evaluation based on two selected two-tuples is a line on which numerous potential P-states lie.

In the alternative, if legacy P-state table generation is not required (block 408), power state generation is carried out through the use of curve fitting procedures (block 412). As with the linear potential P-state generation, the curve fitting carried out at block 412 results in a number of potential P-states that lie along the resultant fit curve. The curve fit may be carried out using any number of different curve fitting techniques. For example, the P-states may be generated by using a cubic spline interpolation such as shown below in Equation 2.

$$v(f) = \sum_{k=0}^{n} P_k B_{k,d}(f) \qquad \text{Equation 2}$$

In Equation 2, v is the voltage at a clock frequency f, k is an index of the points represented by the two-tuples read from the register, P is the voltage of the two-tuple at index k, and B is a basis or Bezier function valued at index k for the number of points d, and frequency f. For example, when considering four two-tuples (k=0 to K=3) and 4 points, Equation 2 becomes as shown in Equation 3 and expands to the function shown in Equation 4.

$$v(f) = \sum_{k=0}^{3} P_k B_{k,4}(f) \qquad \text{Equation 3}$$

$$v(f) = P_0 \frac{1}{6}(1 - 3f + 3f^2 - f^3) +$$
$$P_1 \frac{1}{6}(4 - 6f^2 + 3f^3) +$$
$$P_2 \frac{1}{6}(1 + 3f + 3f^2 - 3f^3) + P_3 \frac{1}{6}(f^3) \qquad \text{Equation 4}$$

As noted above, any curve fitting equation or procedure may be carried out to interpolate between the two-tuples of operating parameters read from the registers of the processor 100. For example, the interpolation may be based on wavelet transformation, cubic spline interpolation, Fourier transformation, Bezier functions, and/or n$^{th}$ degree polynomial transformations and/or basis functions.

After the potential P-states have been generated, either by the linear process (block 410) or curve fit (block 412), P-states are selected are selected from the potential P-states and the P-state table is built (block 414). The P-states may be selected from the potential P-states based on power consumption and performance considerations. For example, it may be desirable to select numerous relatively high power consumption states having a high clock frequency and high operating voltage, along with a number of relatively lower power consumption states at which processor clock speed and operating voltage are relatively low. Such a selection of a mixture of high and low performance and power consumption states enables an operating system, which will be booted at some time in the future, to select an array of processor operating points (e.g., clock speeds and supply voltages) based on power consumption and performance tradeoffs. Alternatively, as noted above, the P-states may be selected by selecting points that are uniformly distributed along the curve representing the potential P-states. For example, 16 or 32 points may be selected along the potential P-state line 222 of FIG. 2. The selected points, which represent P-states, are written to a P-state table, which may be accessed later by an operating system.

After the P-states have been selected (block 414), the process 400 builds an Advanced Configuration and Power Interface (ACPI) table to which the P-state table generated at block 414 is added (block 416). The generation of an ACPI table and the addition of a P-state table to the ACPI table (block 416) are well known and, therefore, will not be described further here.

After the ACPI table has been generated and the P-state table has been added (block 416), the process 400 boots an OS, such as Windows or any other OS that may be desired (block 418). After booting, the process 400 determines if a power management event has occurred (block 420). As will be readily appreciated by those having ordinary skill in the art, power management events may include, but are not limited to, an OS's desire to hibernate or standby. For example, an OS operating on a notebook computer may desire to hibernate or standby in response to the closure of the notebook lid or in response to a predefined set of keystrokes.

If no power management event has occurred (block 420), the OS continues to operate in its normal fashion and carry out its assigned tasks (block 422). In the alternative, if a power management event has occurred (block 420), the process 400 determines if power management is enabled (block 424). If the OS does not have power management enabled (block 424), the OS continues to operate as normal (block 422). If, however, power management is enabled (block 424), the process 400 uses the P-state table to perform power management (block 426) and returns to normal operation (block 422) when another power management event has occurred.

As noted above, the process 400 may be carried out by any form of logic including hardware, software, firmware, or any combination thereof. For example, the functions represented by blocks 402, 404, 406, 408, 410, 412, 414, and 416 of FIG. 4 may be carried out by firmware stored in memory and executed as part of a BIOS. In particular, software representing these functions may be written in a high level language such as, for example, C before being compiled into a machine code format that is executed as part of the BIOS.

Figure 5:
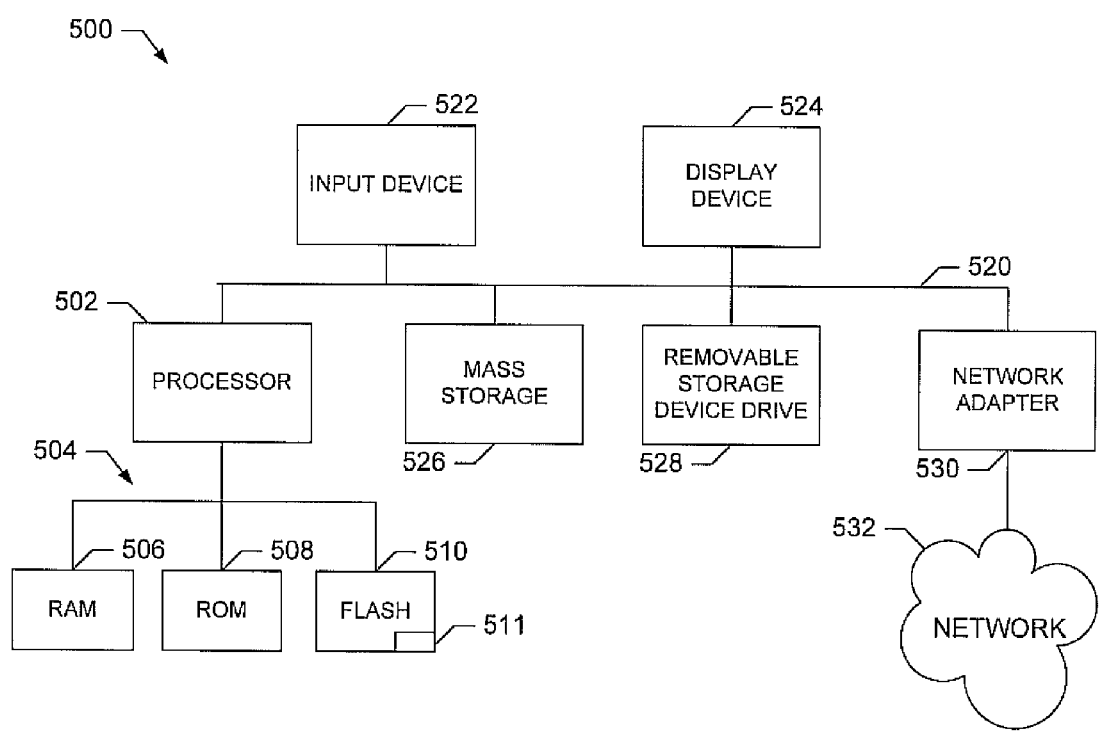
FIG. 5 is a block diagram of a processor system of which the processor of FIG. 1 may be apart.

As shown in FIG. 5, an example processor system 500 includes a processor 502 having associated memories 504, such as a random access memory (RAM) 506, a read only memory (ROM) 508, and a flash memory 510. The flash memory may include one of more sets of instructions to implement a BIOS including the functionality described above 511. The processor 502 is coupled to an interface, such as a bus 520 to which other components may be interfaced. In the illustrated example, the components interfaced to the bus 520 include an input device 522, a display device 524, a mass storage device 526, and a removable storage device drive 528. The removable storage device drive 528 may include associated removable storage media (not shown), such as magnetic or optical media. The processor system 500 may also include a network adapter 530.

The example processor system 500 may be, for example, a server, a remote device, a conventional desktop personal computer, a notebook computer, a workstation or any other computing device. The processor 502 may be any type of processing unit, such as a microprocessor from the Intel® Pentium® family of microprocessors, the Intel® Itanium® family of microprocessors, and/or the Intel XScale® family of processors. The processor 502 may include on-board analog-to-digital (A/D) and digital-to-analog (D/A) converters.

The memories 504 that are coupled to the processor 502 may be any suitable memory devices and may be sized to fit the storage and operational demands of the system 500. In particular, the flash memory 510 may be a non-volatile memory that is accessed and erased on a block-by-block basis and that stores instruction that cause the processor 502 to, in a pre-boot environment, read processor operating parameters from one or more registers and to determine a non-linear curve fit of these operating parameters.

The input device 522 may be implemented using a keyboard, a mouse, a touch screen, a track pad or any other device that enables a user to provide information to the processor 502.

The display device 524 may be, for example, a liquid crystal display (LCD) monitor, a cathode ray tube (CRT) monitor or any other suitable device that acts as an interface between the processor 502 and a user. The display device 524 includes any additional hardware required to interface a display screen to the processor 502.

The mass storage device 526 may be, for example, a conventional hard drive or any other magnetic or optical media that is readable by the processor 502.

The removable storage device drive 528 may be, for example, an optical drive, such as a compact disk-recordable (CD-R) drive, a compact disk-rewritable (CD-RW) drive, a digital versatile disk (DVD) drive, or any other optical drive. The removable storage device drive 528 may alternatively be, for example, a magnetic media drive. If the removable storage device drive 528 is an optical drive, the removable storage media used by the drive 528 may be a CD-R disk, a CD-RW disk, a DVD disk, or any other suitable optical disk. On the other hand, if the removable storage device drive 48 is a magnetic media device, the removable storage media used by the drive 528 may be, for example, a diskette or any other suitable magnetic storage media.

The network adapter 530 may be any suitable network interface such as, for example, an Ethernet card, a wireless network card, a modem, or any other network interface suitable to connect the processor system 500 to a network 532. The network 532 to which the processor system 500 is connected may be, for example, a local area network (LAN), a wide area network (WAN), the Internet, or any other network. For example, the network could be a home network, an intranet located in a place of business, a closed network linking various locations of a business, or the Internet.

Although certain apparatus constructed in accordance with the teachings of the invention have been described herein, the scope of coverage of this patent is not limited thereto. On the contrary, this patent covers every apparatus, method and article of manufacture fairly falling within the scope of the appended claims either literally or under the doctrine of equivalents.

What is claimed is:

1. A method of performing power management of a processor, the method comprising:
    obtaining a plurality of operating parameters related to the processor in a pre-boot environment;
    determining, in the pre-boot environment, whether the processor supports non-linear power state generation;
    determining, in the pre-boot environment, potential power states by using a non-linear function to fit a non-linear curve to the plurality of operating parameters in response to determining the processor supports non-linear power state generation, wherein the non-linear function is based on one or more of a wavelet transformation, a cubic spline interpolation, a Fourier transformation, a Bezier function, or an $n^{th}$ degree polynomial;
    selecting at least some of the potential power states as power states used to manage power consumption by the processor; and
    managing power consumption of the processor based on at least one selected power state.

2. A method as defined by claim 1, wherein obtaining the plurality of operating parameters related to the processor comprises reading the plurality of operating parameters from the processor.

3. A method as defined by claim 2, wherein reading the plurality of operating parameters from the processor comprises reading the plurality of operating parameters from registers located in the processor.

4. A method as defined by claim 1, wherein the plurality of operating parameters each comprises a frequency/voltage pair.

5. A method as defined by claim 1, wherein fitting the non-linear curve to the plurality of operating parameters comprises fitting the non-linear curve on a frequency and voltage coordinate system.

6. A method as defined by claim 1, further comprising writing the selected number of potential power states to a power state table.

7. A method as defined by claim 6, further comprising building an advanced configuration and power interface table based on the power state table.

8. A method as defined by claim 1, wherein the selecting is performed in a pre-boot environment.

9. A method as defined by claim 1, wherein a first number of selected power states is greater than a second number of the plurality of operating parameters.

10. An article of manufacture comprising a machine accessible medium having a plurality of machine accessible instructions to perform power management of a processor that, when executed, cause a machine to:
    obtain a plurality of operating parameters related to the processor in a pre-boot environment;
    determine, in the pre-boot environment, whether the processor supports non-linear power state generation;
    determine, in the pre-boot environment, potential power states by using a non-linear function to fit a non-linear curve to the plurality of operating parameters in response to determining the processor supports non-linear power state generation, wherein the non-linear function is based on one or more of a wavelet transformation, a cubic spline interpolation, a Fourier transformation, a Bezier function, or an $n^{th}$ degree polynomial; and select at least some of the potential power states as power states used to manage power consumption by the processor.

11. A machine accessible medium as defined by claim 10, wherein obtaining the plurality of operating parameters related to the processor comprises reading the plurality of operating parameters from registers located in the processor.

12. A machine accessible medium as defined by claim 10, wherein the plurality of operating parameters each comprises a frequency/voltage pair.

13. A machine accessible medium as defined by claim 10, wherein fitting the non-linear curve to the plurality of operating parameters comprises fitting the non-linear curve on a frequency and voltage coordinate system.

14. A machine accessible medium as defined by claim 10, wherein the machine accessible instructions, when executed, further cause the machine to write the selected number of potential power states to a power state table.

15. A machine accessible medium as defined by claim 10, wherein selecting is performed in the pre-boot environment.

16. A tangible power state table generator coupled to registers located in a processor to perform power management of the processor, the power state table generator comprising:
    a register reader to obtain a plurality of operating parameters related to the processor and to determine if the processor supports non-linear power state generation in a pre-boot environment;
    an interpolator coupled to the register reader to determine, in the pre-boot environment, potential power states by using a non-linear function to fit a non-linear curve to the plurality of operating parameters in response to determining the processor supports non-linear power state generation, wherein the non-linear function is based on one or more of a wavelet transformation, a cubic spline interpolation, a Fourier transformation, a Bezier function, or an $n^{th}$ degree polynomial; and
    a power state selector coupled to the interpolator to select at least some of the potential power states as power states used to manage power consumption by the processor.

17. A power state table generator as defined by claim 16, wherein the register reader obtains the plurality of operating parameters related to the processor by reading the plurality of operating parameters from the registers in the processor.

18. A power state table generator as defined by claim 16, wherein the plurality of operating parameters each comprises a frequency/voltage pair.

19. A power state table generator as defined by claim 16, wherein the interpolator fits the non-linear curve to the plurality of operating parameters by fitting the non-linear curve on a frequency and voltage coordinate system.

20. A power state table generator as defined by claim 16, wherein the power state selector selects the selected number of potential power states at evenly space intervals along the non-linear curve.

21. A power state table generator as defined by claim 16, wherein the power state selector selects the potential power states as power states in the pre-boot environment.

22. A power state table generator as defined by claim 16, wherein the power state table generator is located in the processor.

23. A processor system comprising:
    a processor;
    a register storing a plurality of operating parameters related to the processor;
    a memory storing instructions that when executed by the processor cause the processor to:
        read the register in a pre-boot environment to obtain at least some of the plurality of operating parameters related to the processor;
        determine, in the pre-boot environment, if the processor supports non-linear power state generation;
        determine, in the pre-boot environment, potential power states by using a non-linear function to fit a non-linear curve to the plurality of operating parameters in response to determining the processor supports non-linear power state generation, wherein the non-linear function is based on one or more of a wavelet transformation, a cubic spline interpolation, a Fourier transformation, a Bezier function, or an $n^{th}$ degree polynomial; and
        select at least some of the potential power states as power states used to manage power consumption by the processor.

24. A processor system as defined by claim 23, wherein the register is located in the processor.

25. A processor system as defined by claim 23, wherein fitting the non-linear curve to the plurality of operating parameters comprises fitting the non-linear curve on a frequency and voltage coordinate system.

26. A method of performing power management of a processor, the method comprising:
    determining if the processor supports non-linear power state generation;
    obtaining a first number of power states that have been determined according to a non-linear curve fit based on a second number of operating parameters in response to determining the processor supports non-linear power state generation, wherein the second number is smaller than the first number; and
    using the power states to manage power consumption of the processor.

27. A method as defined by claim 26, further comprising building an advanced configuration and power interface table based on the power states.

* * * * *